United States Patent
Chang et al.

(10) Patent No.: US 12,086,457 B2
(45) Date of Patent: Sep. 10, 2024

(54) MANAGING SECURE WRITES IN SEMICONDUCTOR DEVICES

(71) Applicant: Macronix International Co., Ltd., Hsinchu (TW)

(72) Inventors: Chin-Hung Chang, Tainan (TW);
Chia-Jung Chen, Zhubei (TW);
Ken-Hui Chen, Hsinchu (TW);
Chun-Hsiung Hung, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 72 days.

(21) Appl. No.: 17/881,078

(22) Filed: Aug. 4, 2022

(65) Prior Publication Data
US 2023/0259301 A1 Aug. 17, 2023

Related U.S. Application Data

(60) Provisional application No. 63/309,641, filed on Feb. 13, 2022.

(51) Int. Cl.
*G06F 3/06* (2006.01)
(52) U.S. Cl.
CPC .......... *G06F 3/0655* (2013.01); *G06F 3/0622* (2013.01); *G06F 3/0679* (2013.01)
(58) Field of Classification Search
CPC .... G06F 3/0655; G06F 3/0622; G06F 3/0679; G06F 21/79; G06F 3/0652; G06F 3/0623; G06F 3/062; G06F 3/0638; G06F 21/602; G06F 21/6218

USPC .................................... 711/154, 100
See application file for complete search history.

(56) References Cited

U.S. PATENT DOCUMENTS

| | | | |
|---|---|---|---|
| 5,363,334 A | 11/1994 | Alexander et al. | |
| 6,073,209 A * | 6/2000 | Bergsten | G06F 3/0619 |
| | | | 711/148 |
| 8,255,655 B2 | 8/2012 | Yu et al. | |
| 2006/0015946 A1* | 1/2006 | Yagawa | G06F 21/80 |
| | | | 726/32 |
| 2008/0263262 A1* | 10/2008 | Sokolov | G11C 16/20 |
| | | | 711/E12.001 |
| 2016/0248588 A1* | 8/2016 | Langhammer | H04L 63/0428 |
| 2019/0035473 A1* | 1/2019 | Rajamani | G06F 3/0679 |
| 2019/0122007 A1* | 4/2019 | Van Antwerpen | G06F 21/602 |
| 2019/0205317 A1* | 7/2019 | Tobias | G06F 40/174 |

* cited by examiner

*Primary Examiner* — David Yi
*Assistant Examiner* — Zubair Ahmed
(74) *Attorney, Agent, or Firm* — Fish & Richardson P.C.

(57) ABSTRACT

Systems, devices, methods, and circuits for managing secure writes in semiconductor devices. In one aspect, a semiconductor device includes a memory array and logic circuitry coupled to the memory array. The logic circuitry is configured to execute a secure write operation in the memory array in response to receiving encrypted information. The encrypted information includes at least one of information of data to be written, an option code, or multiple addresses in the memory array, the option code specifying a way of writing the data on at least one of the multiple addresses in the memory array.

19 Claims, 7 Drawing Sheets

| CMD | | Secure write |
|---|---|---|
| | [2:0]=000 | program onto single address |
| | [2:0]=001 | erase 4KB from single address |
| | [2:0]=010 | erase 32KB from single address |
| | [2:0]=011 | erase 64KB from single address |
| | [2:0]=100 | program onto both 1st and 2nd address |
| | [2:0]=101 | erase 4KB from both 1st and 2nd address |
| | [2:0]=110 | erase 32KB from both 1st and 2nd address |
| Option | [2:0]=111 | erase 64KB from both 1st and 2nd address |
| ADDR1 | | The 1st address of data to be written |
| BC | | Number of bytes to write |
| ADDR2 | | The 2nd address of data to be written |
| Data | | Write Data |

MANAGING SECURE WRITES IN SEMICONDUCTOR DEVICES

CROSS-REFERENCE TO RELATED APPLICATION

This application claims priority under 35 USC § 119(e) to U.S. Provisional Patent Application Ser. No. 63/309,641, entitled "HIGH PERFORMANCE SECURE WRITE" and filed on Feb. 13, 2022, the entire content of which is hereby incorporated by reference.

BACKGROUND

Protecting semiconductor devices such as memory devices from unintentional overwrites, malicious attacks and cloning is essential. To meet security requirements, semiconductor devices can include some specific features such as authentication, which may degrade the performance of the semiconductor devices, e.g., in double secure write operations for data robustness.

SUMMARY

The present disclosure describes methods, devices, systems and techniques for managing secure writes in semiconductor devices, e.g., non-volatile memory devices such as flash memory devices.

One aspect of the present disclosure features a semiconductor device including: a memory array and logic circuitry coupled to the memory array and configured to execute a secure write operation in the memory array in response to receiving encrypted information. The encrypted information includes at least one of information of data to be written, an option code, or multiple addresses in the memory array, the option code specifying an operation type of writing the data to at least one of the multiple addresses in the memory array during the secure write operation.

In some embodiments, the secure write operation includes a programming operation, and the multiple addresses include a first address and a second address. The option code specifies one of programming the data onto the first address, or programming the data onto both the first address and the second address.

In some embodiments, the secure write operation includes an erasing operation, and the multiple addresses include a first address and a second address. The option code specifies one of erasing a specific number of bits of the data from the first address, or erasing a specific number of bits of the data from both the first address and the second address. The specific number of bits can include 4 KB, 32 KB, or 64 KB.

In some embodiments, the memory array includes multiple memory subarrays, and the multiple addresses include a first address and a second address. The logic circuitry can be configured to: in response to determining that the first address and the second address are in a same memory subarray, write the data sequentially to the first address and the second address, and in response to determining that the first address and the second address are in two different memory subarrays, write the data concurrently or sequentially to both of the first address and the second address in the two different memory subarrays. Each of the multiple memory subarrays can be separately and independently coupled to a voltage generator in the semiconductor device.

In some embodiments, the logic circuitry is configured to: receive authentication information and the encrypted information from a controller, and generate an authentication code and decrypted information using a cryptographic algorithm based on the authentication information, the encrypted information, and a cryptographic key shared between the controller and the semiconductor device.

In some embodiments, the cryptographic algorithm includes an Advanced Encryption Standard (AES) algorithm. The AES algorithm can include AES-GCM (Galois/Counter Mode) or AES-CCM (Counter with Cipher Block Chaining-Message Authentication Code).

In some embodiments, the encrypted information includes information of at least one other option code associated with the authentication information, and the authentication code is generated at least partially based on the at least one other option code in the encrypted information.

In some embodiments, the authentication information includes an input authentication code, and the logic circuitry is configured to: compare the generated authentication code with the input authentication code and determine whether an authentication of the controller fails based on a result of the comparing.

In some embodiments, the logic circuitry is configured to: in response to determining that the generated authentication code fails to match the input authentication code, determine that the authentication fails and generate an error message; and in response to determining that the generated authentication code matches the input authentication code, determine that the authentication succeeds and proceed to execute the secure write operation on the decrypted information.

In some embodiments, the logic circuitry is configured to: in response to determining that the generated authentication code matches the input authentication code, decode the option code for executing the secure write operation. In some embodiments, the logic circuitry is configured to decode the option code based on a predetermined table associating different option codes with different write operations.

In some embodiments, the logic circuitry is configured to: in response to determining that the option code specifies writing the data to a first address and a second address among the multiple addresses, determine whether the first address and the second address in a same memory subarray of the memory array, and execute the secure write operation based on a result of the determining whether the first address and the second address in the same memory subarray.

In some embodiments, the decrypted information includes a write command, together with the data to be written, the multiple addresses, and the option code, and the logic circuitry is configured to decode the write command in response to determining that the generated authentication code matches the input authentication code.

In some embodiments, the logic circuitry is configured to decode the write command based on a predetermined protocol between the controller and the semiconductor device. In some embodiments, each of the multiple addresses represents a starting address for writing the data, and where the decrypted information includes length information of the data to write.

In some embodiments, the logic circuitry is configured to receive a packet command, together with the authentication information, and the encrypted information from the controller, and the logic circuitry is configured to generate the authentication code and the decrypted information at least partially based on the packet command.

In some embodiments, the logic circuitry is configured to: determine whether an error occurs during executing the secure write operation, in response to determining that an error occurs, generate an error message, and in response to determining that no error is made, generate a completion message indicating a completion of the secure write operation.

Another aspect of the present disclosure features a system, including: a semiconductor device including a memory array and logic circuitry coupled to the memory array and a controller coupled to the semiconductor device and configured to: encrypt at least one of information of data to be written, an option code, or multiple addresses in the memory array, the option code specifying an operation type of writing the data to at least one of the multiple addresses in the memory array, and transmit the encrypted information to the semiconductor device. The logic circuitry is configured to execute a secure write operation in the memory array in response to receiving the encrypted information from the controller.

In some embodiments, the controller is configured to: generate, using a cryptographic algorithm, the encrypted information and authentication information based on a cryptographic key shared between the semiconductor device and the controller, the option code, the multiple addresses, and the data to be written, and transmit the authentication information, together with the encrypted information, to the semiconductor device.

In some embodiments, the logic circuitry is configured to: receive the authentication information and the encrypted information from the controller, and generate an authentication code and decrypted information using the cryptographic algorithm based on the authentication information, the encrypted information, and the cryptographic key.

In some embodiments, the logic circuitry is configured to: compare the generated authentication code with an input authentication code in the authentication information, in response to determining that the generated authentication code fails to match the input authentication code, generate an error message, in response to determining that the generated authentication code matches the input authentication code, decode the option code for executing the secure write operation, in response to determining that the option code specifies writing the data to a first address and a second address among the multiple addresses, determine whether the first address and the second address in a same memory subarray of the memory array, in response to determining that the first address and the second address are in a same memory subarray, write the data sequentially to the first address and the second address, and in response to determining that the first address and the second address are in two different memory subarrays, write the data concurrently to both of the first address and the second address in the two different memory subarrays.

Another aspect of the present disclosure features a memory device, including: a memory array and logic coupled to the memory array. The memory array includes an input/output port having an input mode and an output mode, and the input/output port has at least one signal line used alternately in both the input mode and an output mode. The logic is configured to execute a secure write operation in response to receiving a write packet command and encrypted information on the input/output port in the input mode. The encrypted information includes an option code and at least two addresses.

Another aspect of the present disclosure features a method of managing secure operations in a semiconductor device, the method including: receiving encrypted information from a controller coupled to the semiconductor device, the encrypted information including at least one of information of data to be written, an option code, or multiple addresses in a memory array of the semiconductor device; and in response to receiving the encrypted information, executing a secure write operation in the memory array according to the option code, the option code specifying an operation type of writing the data to at least one of the multiple addresses in the memory array.

In some embodiments, the method further includes: receiving authentication information together with the encrypted information from the controller, generating an authentication code and decrypted information using a cryptographic algorithm based on the authentication information, the encrypted information, and a cryptographic key shared between the semiconductor device and the controller, and in response to determining that the generated authentication code matches an input authentication code in the authentication information, decoding the option code for executing the secure write operation.

Implementations of the above techniques include methods, systems, circuits, computer program products and computer-readable media. In one example, a method can include the above-described actions. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

DETAILED DESCRIPTION

Implementations of the present disclosure provide techniques for managing secure writes in semiconductor devices such as non-volatile memory devices. A secure write operation can include authentication and data writing. A semiconductor device (e.g., a memory chip) can authenticate whether a controller is recognized through an input message authentication code (MAC) check, and decrypt input information and data from the controller to execute a write operation. To increase data robustness in secure write, besides writing the data to an assigned or designated address, the semiconductor device can write the same data (e.g., redundant data for backup) to a second address different from the assigned address in the semiconductor device for data redundancy. The techniques described herein can avoid performing two separate secure write commands, which takes double secure write operation time and can degrade a secure write performance of the semiconductor device. Instead, the techniques can accomplish a secure and robust write using one secure write command to write same data to multiple different addresses in the semiconductor device, which can enhance the secure write performance of the semiconductor device and reduce software handling efforts.

In some implementations, a secure write protocol transmitted from a controller to a semiconductor device includes a packet command, encrypted information, and authentication information (e.g., MAC to be verified). The encrypted information includes at least one of a write command (e.g., a programming command or an erasing command), an option code, multiple addresses (e.g., a first address and a second address), or data to be written. The option code is used to select a write operation (e.g., program or erase) and specifies an operation type of writing data to at least one of the multiple addresses. The controller can use a cryptographic algorithm (e.g., an AES algorithm such as AES-GCM or AES-CCM) to generate the encrypted information and the authentication information based on a cryptographic key (or secret) shared between the semiconductor device and the controller, the packet command, the write command, the option code, the multiple addresses, and the data to be written.

In some implementations, in response to receiving the encrypted information and the authentication information, the semiconductor device uses the same cryptographic algorithm to decrypt the encrypted information and the authentication information based on the same secret key and the packet command to generate an MAC and decrypted information. The semiconductor device can compare the generated MAC to an input MAC in the received authentication information. If these two MACs match, the semiconductor device verifies that the controller passes the MAC check and proceeds to perform a secure write operation based on the decrypted information.

The techniques disclosed herein provide a multi-address write scheme for high performance secure writes in semiconductor devices. For illustration purposes, a memory device is described herein as an example of a semiconductor device. It is noted that the techniques can be implemented for any type of circuits, devices, or systems that need secure writes. For example, besides memory devices, the techniques can be also applied to any other storage devices that utilize security or cryptographic features for secure writes.

The techniques can be applied to various types of non-volatile memory devices, such as NOR flash memory, NAND flash memory, resistive random-access memory (RRAM), phase-change random-access memory (PCRAM), among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others.

Figure 1A:
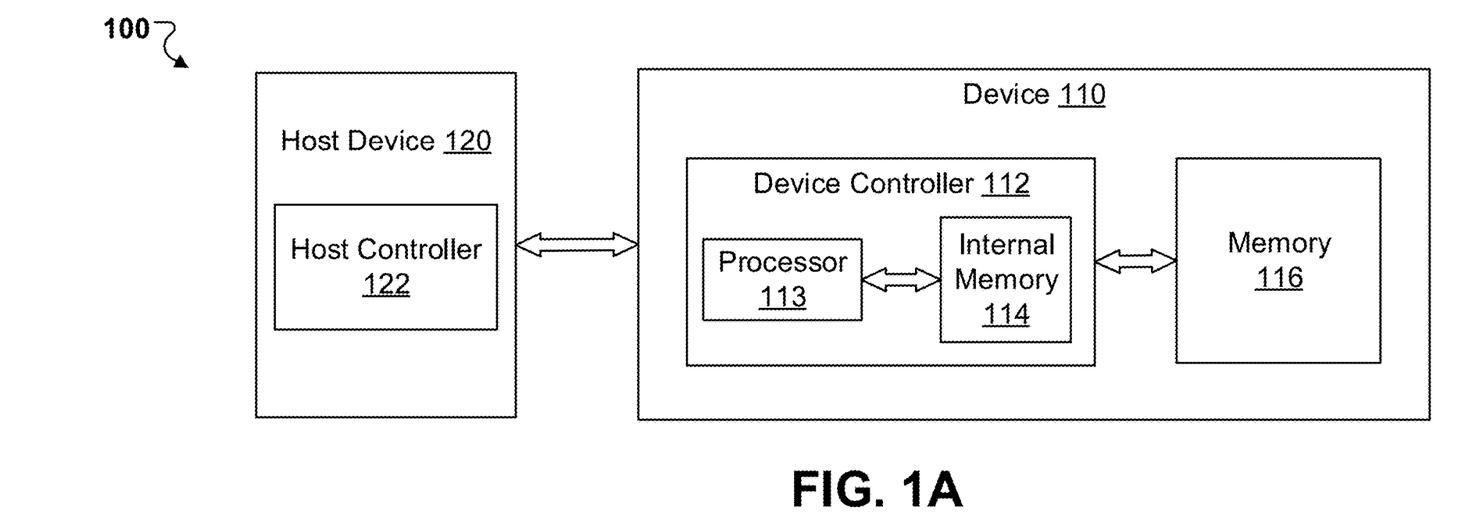
FIG. 1A is a schematic diagram illustrating an example of a system including a memory, according to one or more embodiments of the present disclosure.

FIG. 1A illustrates an example of a system 100. The system 100 includes a device 110 and a host device 120. The device 110 includes a device controller 112 and a memory 116. The device controller 112 includes a processor 113 and an internal memory 114. In some implementations, the device 110 includes a plurality of memories 116 that are coupled to the device controller 112. The memory 116 includes a plurality of blocks. The memory 116 can be a two-dimensional (2D) memory including 2D memory blocks. The memory 116 can also be a three-dimensional (3D) memory including 3D memory blocks.

The host device 120 includes a host controller 122 that can include at least one processor and at least one memory coupled to the at least one processor and storing programming instructions for execution by the at least one processor to perform one or more corresponding operations.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller.

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1A. The internal memory 114 stores instruction codes, which correspond to the instructions executed by the processor 113, and/or the data that are requested by the processor 113 during runtime. The device controller 112 transfers the instruction code and/or the data from the memory 116 to the internal memory 114.

In some implementations, the memory 116 is a non-volatile memory that is configured for long-term storage of instructions and/or data, e.g., an NAND or NOR flash memory device, or some other suitable non-volatile memory device. The memory 116 can include one or more memory chips. In implementations where the memory 116 is an NAND flash memory, the device 110 is a flash memory device, e.g., a flash memory card, and the device controller 112 is an NAND flash controller. For example, in some implementations, when the device 110 is an eMMC or an SD card, the memory 116 is an NAND flash memory; in some implementations, when the device 110 is a digital camera, the memory 116 is an SD card; and in some implementations, when the device 110 is a media player, the memory 116 is a hard disk. In some implementations where the memory 116 is an NOR flash memory, the device 110 can optionally include the device controller 112. In some cases, the device 110 can include no device controller and the memory 116 can directly communicate with the host device 120.

A secure memory device can be a memory device that includes encryption, decryption, and/or authentication features. For example, a secure memory device can encrypt and/or decrypt data, and/or verify (or check) an authentication code from a controller to authenticate the controller.

Figure 1B:
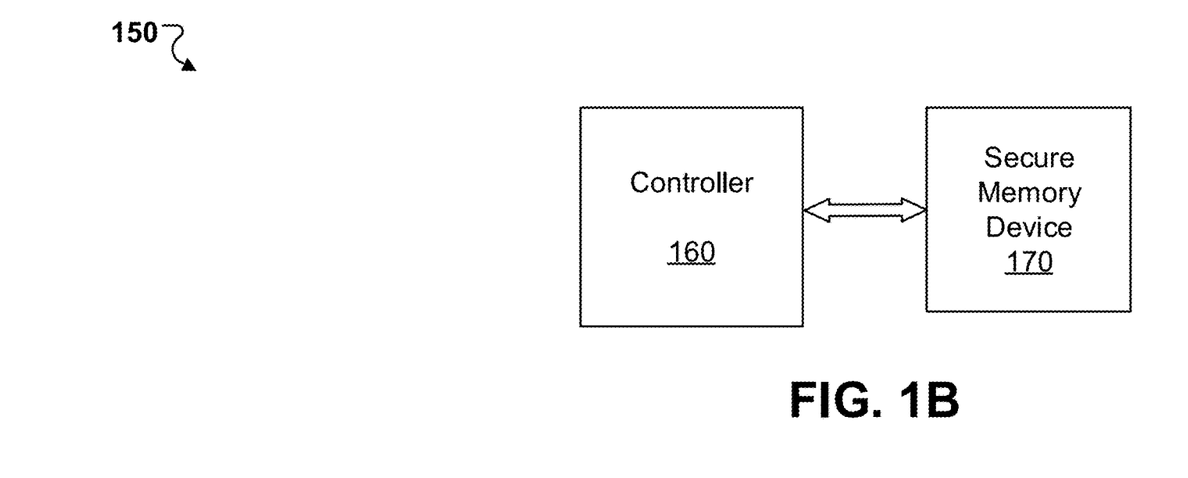
FIG. 1B is a schematic diagram illustrating another example of a system including a secure memory device and a controller, according to one or more embodiments of the present disclosure.

FIG. 1B is a schematic diagram illustrating another example of a system 150 including a controller 160 and a secure memory device 170, according to one or more embodiments of the present disclosure. The controller 160 is coupled to the secure memory device 170 via an electrical connection, e.g., an electrical wire, pin or bus, or a wireless connection, and communicates, e.g., directly, with the secure memory device 170. The controller 160 can be the host controller 122 of FIG. 1A or the device controller 112 of FIG. 1A. The secure memory device 170 can be implemented as the memory 116 of FIG. 1A. The secure memory device 170 can be also a secure memory device 200 as described with further details in FIG. 2, a secure memory device 300 as described with further details in FIG. 3, or a secure memory device as described with further details in FIG. 4.

Figure 2:
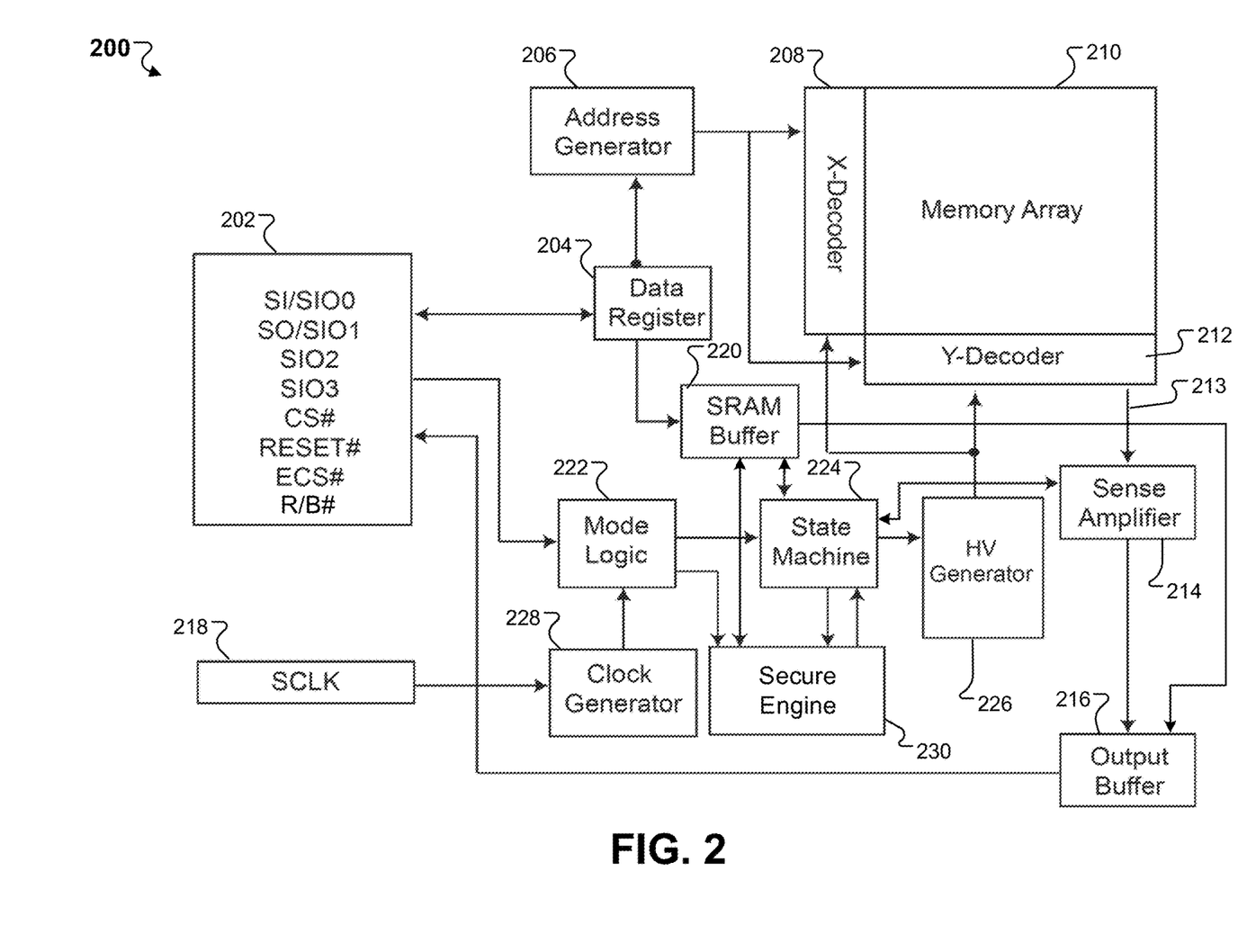
FIG. 2 is a schematic diagram illustrating an example of a secure memory device, according to one or more embodiments of the present disclosure.

FIG. 2 is a schematic diagram illustrating an example of a secure memory device 200, according to one or more embodiments of the present disclosure. The secure memory device 200 can be implemented as the memory 116 of FIG. 1A or the secure memory device 170 of FIG. 1B. The secure memory device 200 can be configured to perform secure write operations.

As illustrated in FIG. 2, the secure memory device 200 includes a number of components that can be integrated onto a board, e.g., a Si-based carrier board, and be packaged. The memory 200 can have a memory array 210 that can include a number of memory cells. The memory cells can be coupled in series to a number of row word lines and a number of column bit lines. Each memory cell can include a memory transistor configured as a storage element to store data. The memory transistor can include a silicon-oxide-nitride-oxide-silicon (SONOS) transistor, a floating gate transistor, a nitride read only memory (NROM) transistor, or any suitable non-volatile memory MOS device that can store charges.

The secure memory device 200 can include an X-decoder (or row decoder) 208 and optionally a Y-decoder (or column decoder) 212. Each memory cell can be coupled to the X-decoder 208 via a respective word line and coupled to the Y-decoder 212 via a respective bit line. Accordingly, each memory cell can be selected by the X-decoder 208 and the Y-decoder 212 for read or write operations through the respective word line and the respective bit line.

The secure memory device 200 can include a memory interface (input/ouput—I/O) 202 having multiple pins configured to be coupled to an external device, e.g., the device controller 112 and/or the host device 120 of FIG. 1A or the controller 160 of FIG. 1B. The pins can include SI/SIO0 for serial data input/serial data input & output, SO/SIO1 for serial data output/serial data input &output, SIO2 for serial data input or output, S103 for serial data input or output, RESET # for hardware reset pin active low, CS # for chip select, and ECS # for ECC correction signal, and R/B # pin for indicating a ready or busy status of the secure memory device 200. ECS is abbreviation of Error Correction Code (ECC) Correction Signal. The memory interface 202 can also include one or more other pins, e.g., WP # for write protection active low, and/or Hold # for a holding signal input.

The secure memory device 200 can include a data register 204, an SRAM buffer 220, an address generator 206, a synchronous clock (SCLK) input 218, a clock generator 228, a mode logic 222, a state machine 224, and a high voltage (HV) generator 226. The SCLK input 218 can be configured to receive a synchronous clock input and the clock generator 228 can be configured to generate a clock signal for the secure memory device 200 based on the synchronous clock input. The mode logic 222 can be configured to determine whether there is a read or write operation and provide a result of the determination to the state machine 224.

The secure memory device 200 can also include a sense amplifier 214 that can be optionally connected to the Y-decoder 212 by a data line 213 and an output buffer 216 for buffering an output signal from the sense amplifier 214 to the memory interface 202. The sense amplifier 214 can be part of read circuitry that is used when data is read from the secure memory device 200. The sense amplifier 214 can be configured to sense low power signals from a bit line that represents a data bit (1 or 0) stored in a memory cell and to amplify small voltage swings to recognizable logic levels so the data can be interpreted properly. The sense amplifier 214 can also communicate with the state machine 224, e.g., bidirectionally.

A controller, e.g., the host controller 122 or the device controller 112 of FIG. 1A or the controller 160 of FIG. 1B, can generate commands, such as read commands and/or write commands that can be executed respectively to read data from and/or write data to the secure memory device 200. Data being written to or read from the memory array 210 can be communicated or transmitted between the secure memory device 200 and the controller and/or other components via a data bus (e.g., a system bus), which can be a multi-bit bus.

In some examples, during a read operation, the secure memory device 200 receives a read command from the controller through the memory interface 202. The state machine 224 can provide control signals to the HV generator 226 and the sense amplifier 214. The sense amplifier 214 can also send information, e.g., sensed logic levels of data, back to the state machine 224. The HV generator 226 can provide a voltage to the X-decoder 208 and the Y-decoder 212 for selecting a memory cell. The sense amplifier 214 can sense a small power (voltage or current) signal from a bit line that represents a data bit (1 or 0) stored in the selected memory cell and amplify the small power signal swing to recognizable logic levels so the data bit can be interpreted properly by logic outside the secure memory device 200. The output buffer 216 can receive the amplified voltage from the sense amplifier 214 and output the amplified power signal to the logic outside the secure memory device 200 through the memory interface 202.

In some examples, during a write operation, the secure memory device 200 receives a write command from the controller. The data register 204 can register input data from the memory interface 202, and the address generator 206 can generate corresponding physical addresses to store the input data in specified memory cells of the memory array 210. The address generator 206 can be connected to the X-decoder 208 and Y-decoder 212 that are controlled to select the specified memory cells through corresponding word lines and bit lines. The SRAM buffer 220 can retain the input data from the data register 204 in its memory as long as power is being supplied. The state machine 224 can process a write signal from the SRAM buffer 220 and provide a control signal to the HV generator 226 that can generate a write voltage and provide the write voltage to the X-decoder 208 and the Y-decoder 212. The Y-decoder 212 can be configured to output the write voltage to the bit lines for storing the input data in the specified memory cells. The state machine 224 can also provide information, e.g., state data, to the SRAM buffer 220. The SRAM buffer 220 can communicate with the output buffer 216, e.g., sending information or data out to the output buffer 216.

As illustrated in FIG. 2, the secure memory device 200 includes a secure engine 230 configured to perform secure write operations. The secure engine 230 can be coupled to one or more components in the secure memory device 200, e.g., the SRAM buffer 220, the mode logic 222, and/or the state machine 224. The secure engine 230 can communicate, e.g., bidirectionally, with at least one of the SRAM buffer 220, the mode logic 222, or the state machine 224. As described with further details below, the SRAM buffer 220 can input additional authentication data (AAD) and Ciphertext (CT) to the secure engine 230. The mode logic 222 can decode a packet command from the controller for the secure engine 230. The state machine 224 can activate the secure engine 230, e.g., in response to receiving a secure write command from the controller, and/or check the secure engine 230 whether an authentication of the controller fails or succeeds.

As discussed with further details in FIGS. 3 to 7, the secure engine 230 can be configured to: i) decrypt (and/or encrypt) information (e.g., write command, option code, addresses, and data) using a cryptographic key, ii) generate an authentication code to verify authentication information from the controller and authenticate the controller, and/or iii) perform secure writing data to one or more addresses in the memory array 210.

Figure 3:
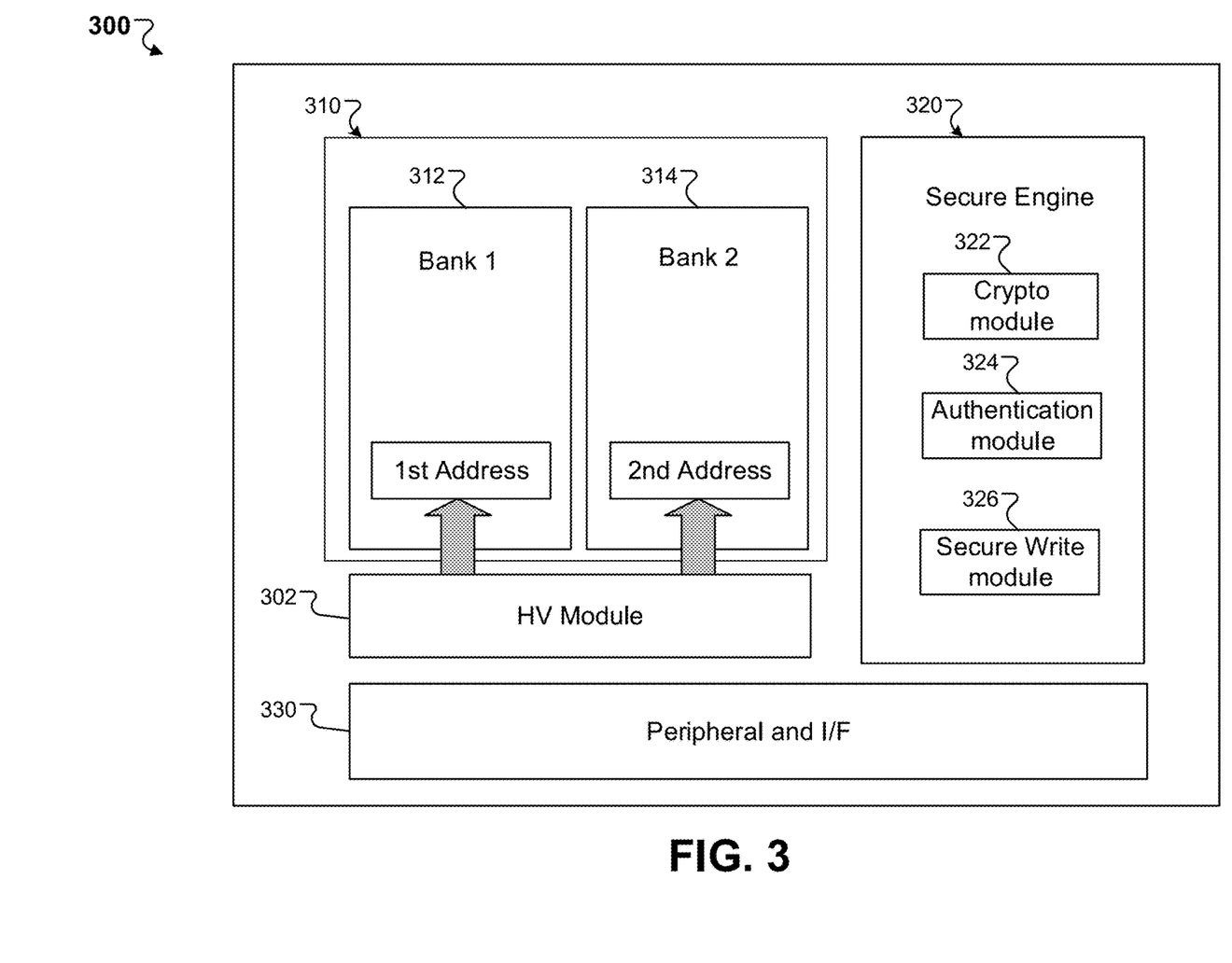
FIG. 3 is a schematic diagram illustrating another example of a secure memory device, according to one or more embodiments of the present disclosure.

FIG. 3 is a schematic diagram illustrating another example of a secure memory device 300, according to one or more embodiments of the present disclosure. The secure memory device 300 can be implemented as the memory 116 of FIG. 1A, the secure memory device 170 of FIG. 1B, or the secure memory device 200 of FIG. 2.

Similar to the secure memory device 200, the secure memory device 300 includes a memory array 310 (e.g., the memory array 210 of FIG. 2), a secure engine 320 (e.g., the secure engine 230 of FIG. 2), a high voltage (HV) module 302 (e.g., the HV generator 226 of FIG. 2), and peripheral and interface (I/F) 330. The peripheral and interface (I/F) 330 can include one or more other components in the secure memory device 300, e.g., the memory interface 202, the data register 204, the address generator 206, the X-decoder 208, the Y-decoder 212, the data line 213, the sense amplifier 214, the output buffer 216, the SCLK 218, the SRAM buffer 220, the mode logic 222, and/or the state machine 224 as described in FIG. 2.

The memory array 310 can include multiple memory subarrays or banks, e.g., bank 312 and bank 314 as illustrated in FIG. 3. Each memory subarray or bank can include a respective plurality of memory cells and can be individually (separately and independently) coupled to the HV module 302 which provides a respective write voltage to the memory subarray or bank. As discussed with further details in FIG. 6, the secure engine 320 can determine whether two addresses where data is written to are within a same memory bank. If the two addresses are in the same memory bank, the secure engine 320 writes the data (an entirety of the data) sequentially in the two addresses. If the two addresses are in two different banks, e.g., 1st address in bank 312, 2nd address in bank 314 as illustrated in FIG. 3, the secure engine 320 can write the data concurrently or sequentially in the two addresses in the different banks. The secure engine 320 can also write data concurrently or sequentially in more than two addresses in a same bank or different banks.

In some implementations, the secure engine 320 includes a cryptographic (crypto) module 322, an authentication module 324, and a secure write module 326. Each of the modules 322, 324, 326 can include one or more logic circuits and/or registers configured to implement an algorithm or an operation.

The crypto module 322 is configured to decrypt, using a cryptographic algorithm, encrypted information and/or authentication information, e.g., received from a controller such as the host controller 122 or the device controller 112 of FIG. 1A or the controller 160 of FIG. 1B. The cryptographic algorithm can be an authenticated encryption algorithm designed to provide both authentication and confidentiality. In some examples, the cryptographic algorithm is an Advanced Encryption Standard (AES) algorithm, e.g., Advanced Encryption Standard Galois Counter Mode (AES-GCM), or Advanced Encryption Standard-Counter with Cipher Block Chaining-Message Authentication Code (AES-CCM). The authentication module 324 is configured to authenticate the controller based on a result of comparing an authentication code generated by the crypto module 322 with an input authentication code from the controller. The secure write module 326 is configured to execute a secure write operation, e.g., in response to determining that the controller is authenticated, in the memory array 310.

Figure 4:
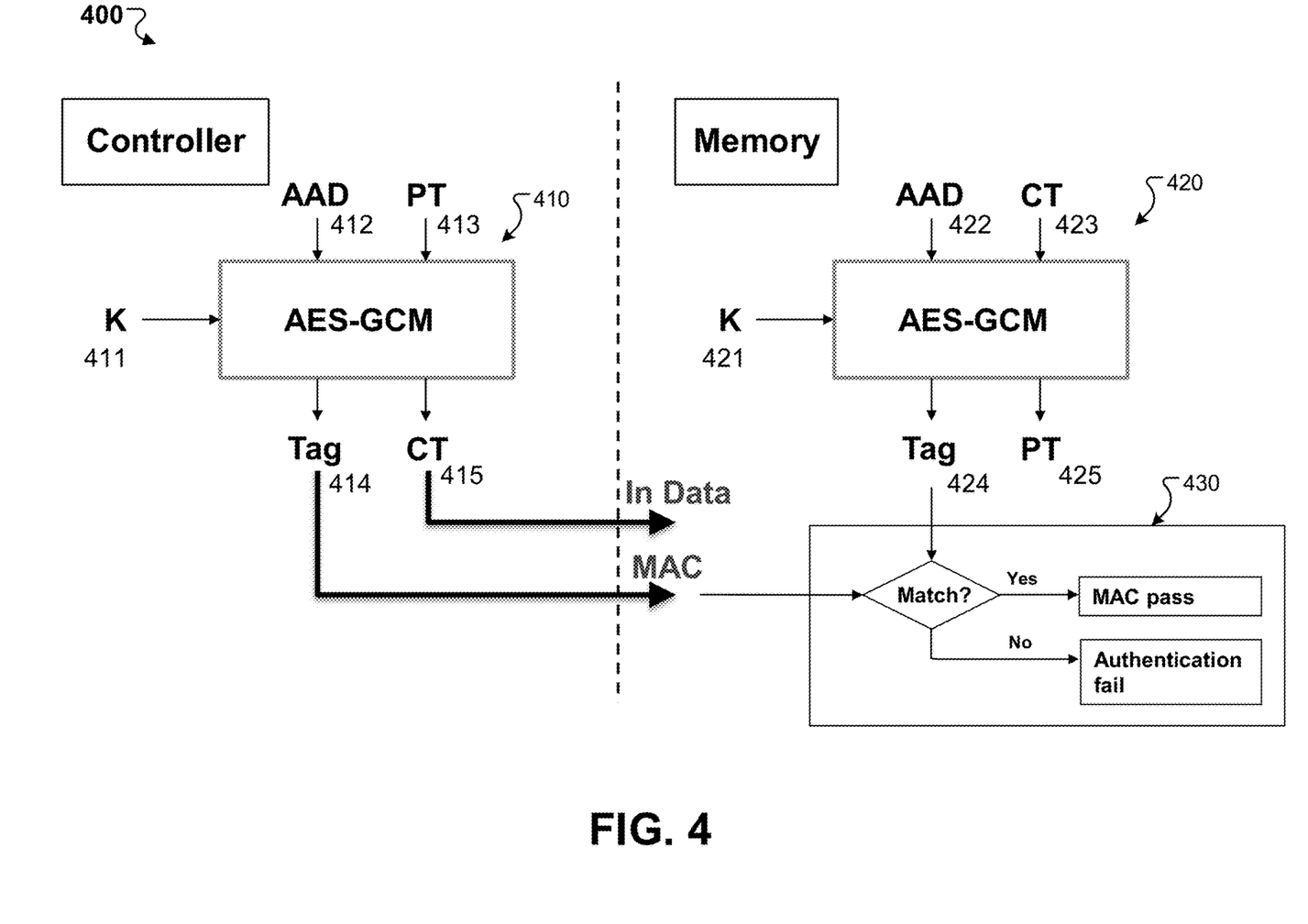
FIG. 4 is a schematic diagram illustrating an example of secure write between a controller and a secure memory device, according to one or more embodiments of the present disclosure.

FIG. 4 is a schematic diagram illustrating an example 400 of secure write between a controller and a secure memory device, according to one or more embodiments of the present disclosure. The controller can be the host controller 122 or the device controller 112 of FIG. 1A or the controller 160 of FIG. 1B. The secure memory device can be the memory 116 of FIG. 1A, the secure memory device 170 of FIG. 1B, the secure memory device 200 of FIG. 2, or the secure memory device 300 of FIG. 3.

The controller can send a packet command with encrypted information and authentication information to the secure memory device for secure write operations. The authentication information can include a message authentication code (MAC). The encrypted information can include information of a write command (CMD Write), option code information, data information, and address information.

Figure 5:
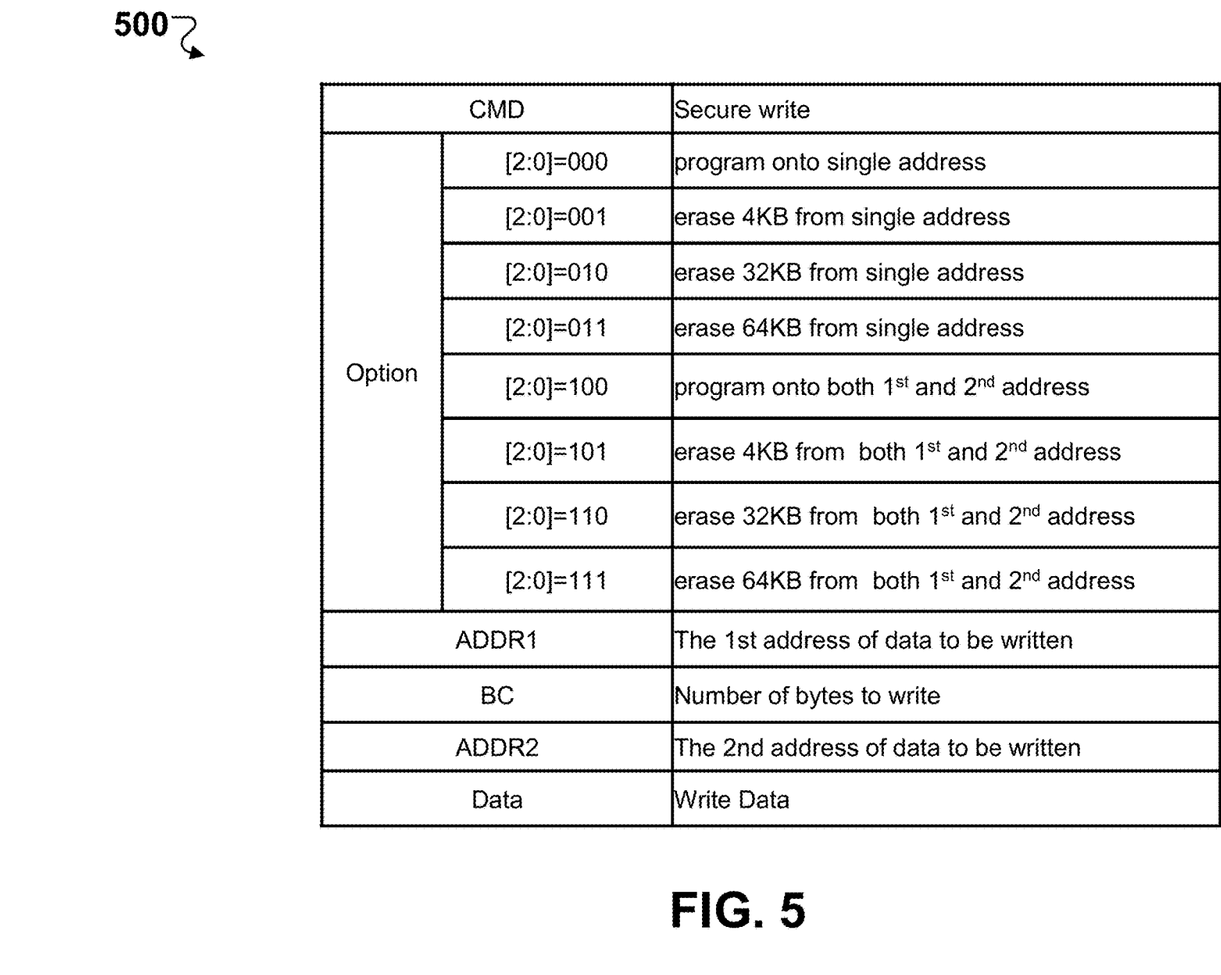
FIG. 5 is a schematic diagram illustrating an example table listing information to be encrypted, according to one or more embodiments of the present disclosure.

FIG. 5 is a schematic diagram illustrating an example table 500 listing information to be encrypted, according to one or more embodiments of the present disclosure. The table 500 associates different codes with corresponding operations. For example, CMD code indicates a secure write operation. ADDR1 code indicates a first address (e.g., a first starting address) for data to be written. ADDR2 code indicates a second address (e.g., a second starting address) for the same data to be written. The first address can be a designated address, and the second address can be a backup address. BC indicates a number of bytes in the data to write. Data indicates write data or data to be written.

Option code is used to specify an operation type of writing data onto a single address or two addresses. As illustrated in FIG. 5, the option code can be represented by three bits [2:0]. For example, option [2:0] being 000 specifies programming data onto a single address (e.g., the first address), option [2:0] being 001 specifies erasing 4 KB data from a single address (e.g., the first address), option [2:0] being 010 specifies erasing 32 KB data from a single address (e.g., the first address), option [2:0] being 011 specifies erasing 64 KB data from a single address (e.g., the first address), option [2:0] being 100 specifies programming the data onto both the first address and the second address, option [2:0] being 101 specifies erasing 4 KB data from both the first address and the second address, option [2:0] being 110 specifies erasing 32 KB data from both the first address and the second address, option [2:0] being 111 specifies erasing 64 KB data from both the first address and the second address. A secure write command can be associated with an option code among the list of option codes.

In some embodiments, the information to be encrypted includes one or more other option codes associated with authentication information. For example, an option code indicates including linked message codes in the MAC, or including a serial number (SN) in the MAC, or including a first four bytes of ExtraZone in the MAC.

Referring back to FIG. 4, each of the controller and the secure memory device can include a respective cryptographic module 410, 420 using a same cryptographic algorithm, e.g., AES-GCM, for authenticated encryption/decryption. The controller and the secure memory device share a same secret or cryptographic key K.

In the controller, as illustrated in FIG. 4, the cryptographic module 410 uses the cryptographic key K 411, additional authentication data (AAD) 412 such as the packet command, and plaintext (PT) 413 as inputs, and generates an authentication tag (or MAC code) 414 and Ciphertext (or In Data) 415 as outputs by the cryptographic algorithm such as AES-GCM. The PT 413 can include the information to be encrypted, e.g., as illustrated in FIG. 5. The cryptographic algorithm can be configured to disorder or disorganize the inputs (e.g., the cryptographic key K 411, the AAD 412, and the PT 413) and then use a secure algorithm or function, e.g., a secure hash algorithm (SHA) such as SHA 128 or SHA 256, to generate the authentication tag 414. The cryptographic algorithm can be also configured to encrypt the PT 413 with the cryptographic key K 411 to generate the encrypted information as CT (or In Data) 415. The controller can then transmit the packet command 412, the authentication tag or MAC code 414, and the encrypted information CT or In Data 415 to the secure memory device.

In the secure memory device, as illustrated in FIG. 4, the crypto module 420 performs authenticated decryption by using a cryptographic key K 421 (same as K 411), the AAD (e.g., the packet command received from the controller) 422, and the CT (e.g., the received In Data) 423 as inputs, and generating an authentication tag (or MAC code) 424 and plaintext (PT) 425 as outputs by the same cryptographic algorithm such as AES-GCM. The PT 425 represents decrypted information that can be same as the PT 413, that is, the information to be encrypted, e.g., as illustrated in FIG. 5. The secure memory device can include an authentication module 430 (e.g., the authentication module 324 of FIG. 3) configured to receive the input authentication tag (or MAC code) 414 from the controller and the generated authentication tag (or MAC code) 424 from the crypto module 420 and compare whether the two authentication tags (or MAC codes) 414, 424 match with each other. If the two authentication tags (or MAC codes) fail to match, the authentication module 430 can determine that the authentication of the controller fails and returns an error message to the controller. If the two authentication tags (or MAC codes) match, the authentication module 430 can determine that the input authentication tag (or MAC code) passes, that is, the controller is authenticated. In response to determining that the controller is authenticated, the secure memory device can execute a secure write operation.

Figure 6:
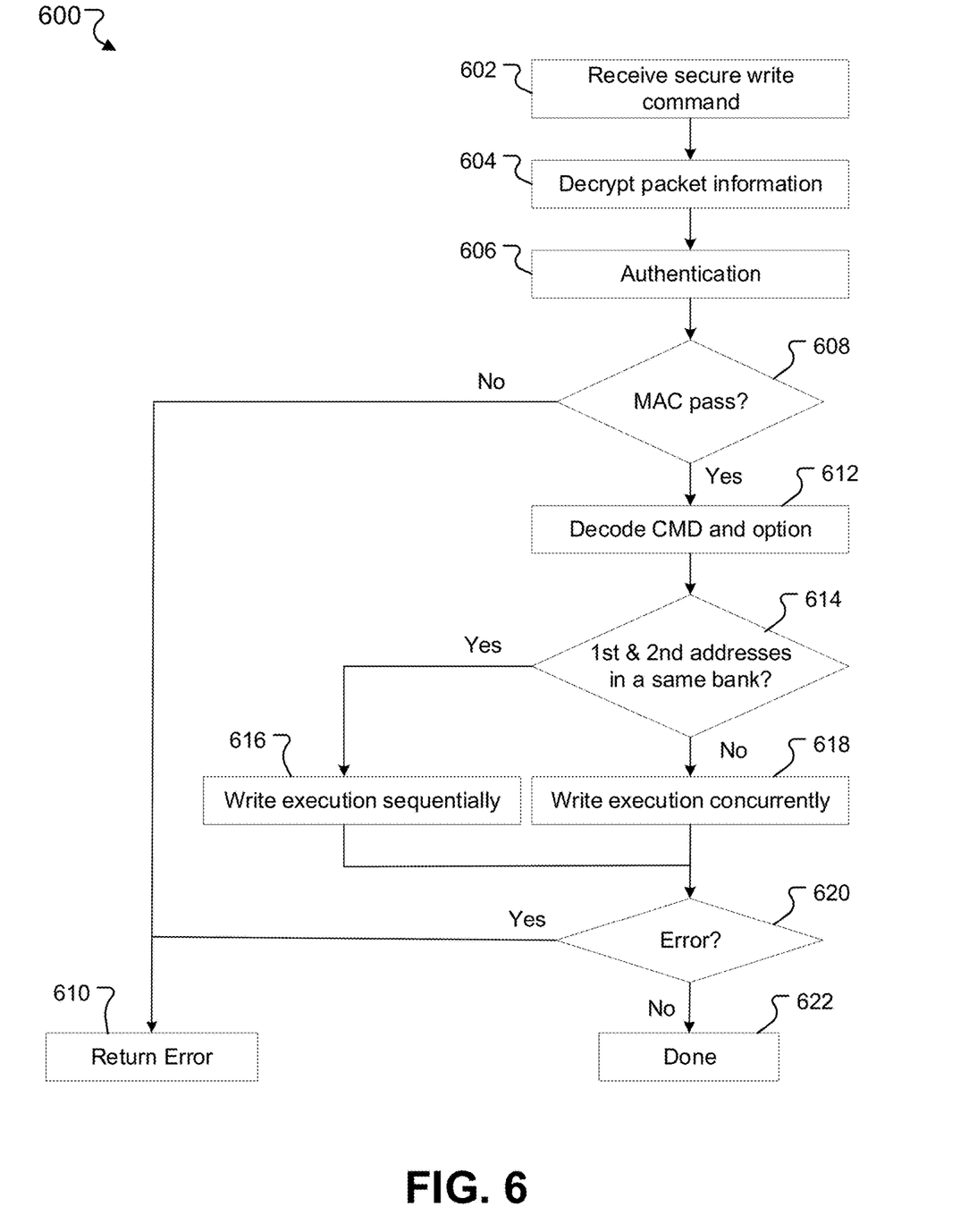
FIG. 6 is a flow chart of an example of a process for managing secure writes in a secure memory device, according to one or more embodiments of the present disclosure.

FIG. 6 is a flow chart of an example of a process 600 for managing secure writes in a secure memory device, according to one or more embodiments of the present disclosure. The process 600 can be performed by the secure memory device, e.g., the memory 116 of FIG. 1A, the secure memory device 170 of FIG. 1B, the secure memory device 200 of FIG. 2, the secure memory device 300 of FIG. 3, or the secure memory device as described in FIG. 4. The secure memory device can include a memory array (e.g., the memory array 210 of FIG. 2 or the memory array 310 of FIG. 3) and logic circuitry (e.g., the secure engine 230 of FIG. 2 or the secure engine 320 of FIG. 3).

In some embodiments, the logic circuitry includes a cryptographic module (e.g., the crypto module 322 of FIG. 3 or 420 of FIG. 4), an authentication module (e.g., the authentication module 324 of FIG. 3 or 430 of FIG. 4), and a secure write module (e.g., the secure write module 326 of FIG. 3). The logic circuitry can also include one or more other components, e.g., a buffer such as the SRAM buffer 220 of FIG. 2, a mode logic such as the mode logic 222 of FIG. 2, and/or a state machine such as the state machine 224 of FIG. 2.

At step 602, the secure memory device receives a secure write command, e.g., a packet command together with packet information from a controller. The controller can be the host controller 122 or the device controller 112 of FIG. 1A, the controller 160 of FIG. 1B, or the controller as described in FIG. 4. The packet information can include encrypted information (e.g., the CT or In Data 415 of FIG. 4) and authentication information (e.g., the authentication tag or MAC 414 of FIG. 4).

As illustrated in FIG. 4, the controller can include a cryptographic engine (e.g., the crypto engine 410 of FIG. 4) to generate the encrypted information and the authentication information using a cryptographic algorithm (e.g., AES-GCM or AES-CCM) with a cryptographic key (e.g., K 411 of FIG. 4), the packet command (e.g., the AAD 412 of FIG. 4), and information to be encrypted (e.g., the PT 413 of FIG. 4) as inputs. The information to be encrypted can include, e.g., as illustrated in FIG. 5, a write command, data to be written, an option code, two addresses for the data to be written, and/or data length (e.g., a number of bytes to write). The cryptographic key is shared between the controller and the secure memory device.

At step 604, in responsive to receiving the secure write command, the secure memory device decrypts the packet information. For example, as illustrated in FIG. 4, the secure memory device uses the cryptographic module to perform authenticated decryption by using the cryptographic key, the packet command received from the controller, and the encrypted information as inputs and generating an authentication code (e.g., the authentication tag 424 of FIG. 4) and decrypted information (e.g., the PT 425 of FIG. 4) as outputs by the same cryptographic algorithm such as AES-GCM. The decrypted information can be same as the information to be encrypted, e.g., as illustrated in FIG. 5.

At step 606, the secure memory device (e.g., the authentication module in the logic circuitry) performs authentication, e.g., by comparing the generated authentication code with an input message authentication code (MAC) in the received authentication information. At step 608, the secure memory device determines whether the input MAC passes the authentication based on a result of the comparison. If the generated authentication code does not match the input MAC, the secure memory device determines that the input MAC fails and returns an error message (e.g., an error flag) to the controller (step 610). The controller can read a status of the secure memory device, e.g., by R/B # pin in a memory interface such as the memory interface 202 of FIG. 2, and obtain the error message from the secure memory device. If the generated authentication code matches the input MAC, the secure memory device determines that the input MAC passes and the process 600 proceeds to step 612.

At step 612, the secure memory device decodes the write command and the option code in the decrypted information. For example, the secure memory device can decode the write command based on a predetermined protocol between the controller and the secure memory device. The secure memory device can decode the option code, e.g., option code [2:0]=100, based on a predetermined table associating different option codes with different write operations (e.g., as illustrated in FIG. 5). The option code specifies an operation type of writing the data to at least one of the two addresses in the decrypted information.

At 614, the secure memory device (e.g., the secure write module) determines whether first and second addresses in a same bank. The memory array can include multiple memory subarrays or memory banks (e.g., the banks 312, 314 of FIG. 3). If the first and second addresses in the same bank, the secure memory device (e.g., the secure write module) writes the data sequentially in the same bank (step 616). If the first and second addresses in two different banks, the secure memory device (e.g., the secure write module) writes the same data concurrently in the first and second addresses (step 618), which can enhance a dual secure write speed.

At 620, the secure memory device determines whether an error occurs. For example, the secure write operation can fail to be executed, e.g., the write voltage cannot reach a high threshold voltage for programming or cannot erase to a low threshold voltage. If an error occurs, the process 600 proceeds to step 610. If no error occurs, the secure memory device determines that the secure write operation is completed (step 622). In response, the secure memory device can transmit a completion message indicating a completion of the secure write operation to the controller.

Figure 7:
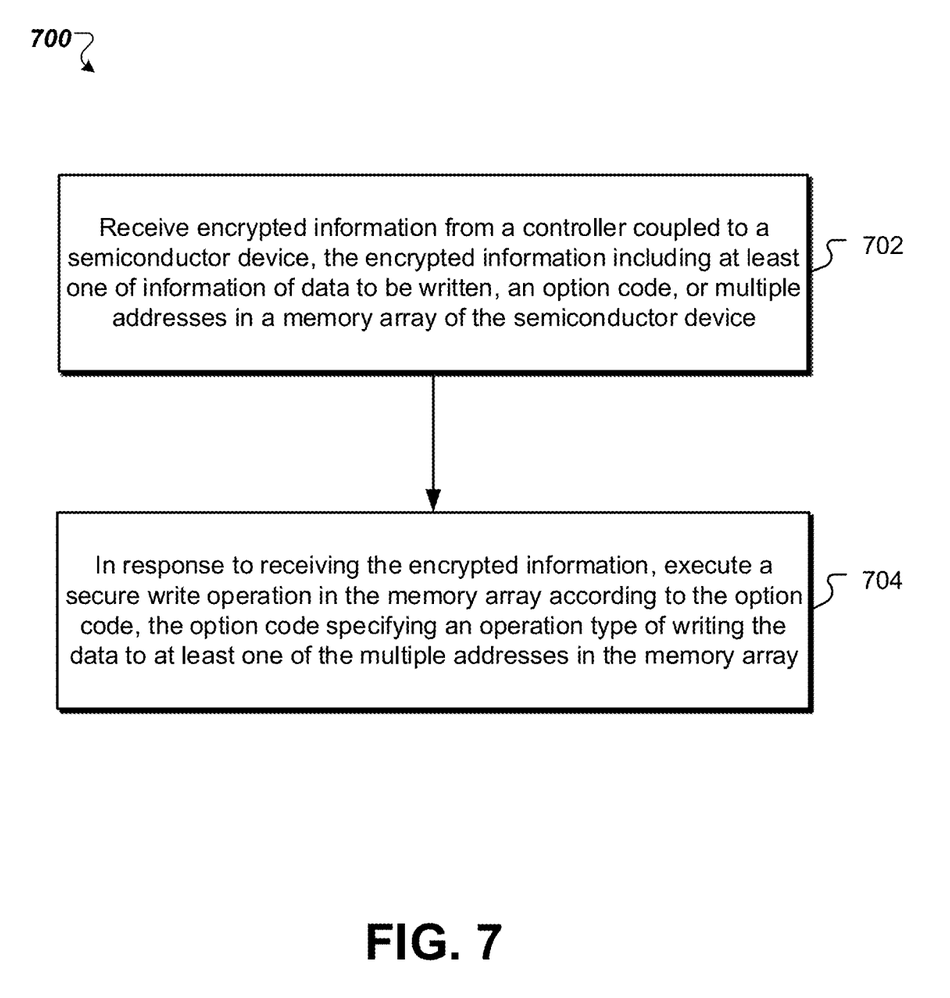
FIG. 7 is a flow chart of another example of a process for managing secure writes in a semiconductor device, according to one or more embodiments of the present disclosure.

FIG. 7 is a flow chart of another example of a process 700 for managing secure writes in a semiconductor device, according to one or more embodiments of the present disclosure. The semiconductor device can be a memory device, e.g., e.g., the memory 116 of FIG. 1A, the secure memory device 170 of FIG. 1B, the secure memory device 200 of FIG. 2, the secure memory device 300 of FIG. 3, or the secure memory device as described in FIG. 4. The secure memory device can include a memory array (e.g., the memory array 210 of FIG. 2 or the memory array 310 of FIG. 3) and logic circuitry (e.g., the secure engine 230 of FIG. 2 or the secure engine 320 of FIG. 3). A controller can be coupled to the semiconductor device. The controller can be the host controller 122 or the device controller 112 of FIG. 1A, the controller 160 of FIG. 1B, or the controller as described in FIG. 4.

At step 702, the semiconductor device receives encrypted information from the controller. The encrypted information includes at least one of information of data to be written, an option code, or multiple addresses in the memory array of the semiconductor device. The multiple addresses can include a first address (e.g., a designated address by the controller to write the data) and a second address (e.g., a backup address to back up the data for data redundancy). The encrypted information can be the encrypted information 415 of FIG. 4.

At step 704, in response to receiving the encrypted information, the semiconductor device executes a secure write operation in the memory array according to the option code. The option code specifies an operation type of writing the data to at least one of the multiple addresses in the memory array, e.g., as illustrated in FIG. 5.

In some embodiments, the secure write operation includes a programming operation. The option code specifies one of programming the data onto the first address (e.g., option code [2:0]=000) or programming the data onto both the first address and the second address (e.g., option code [2:0]=100). In some embodiments, the secure write operation includes an erasing operation. The option code specifies one of erasing a specific number of bits of the data from the first address (e.g., option code [2:0]=001, 010, or 011) or erasing a specific number of bits of the data from both the first address and the second address (e.g., option code [2:0]=101, 110, or 111). The specific number of bits can be 4 KB, 32 KB, or 64 KB.

In some embodiments, the memory array includes multiple memory subarrays (e.g., the banks 312, 314 of FIG. 3). Each of the multiple memory subarrays is separately and independently coupled to a voltage generator (e.g., the HV generator 226 of FIG. 2 or the HV module 302 of FIG. 3) in the semiconductor device.

In some embodiments, the logic circuitry is configured to: in response to determining that the first address and the second address are in a same memory subarray, write the data sequentially to the first address and the second address (e.g., step 616 of FIG. 6), and in response to determining that the first address and the second address are in two different memory subarrays, write the data concurrently to both of the first address and the second address in the two different memory subarrays (e.g., step 618 of FIG. 6).

In some embodiments, the logic circuitry is configured to: receive authentication information (e.g., the MAC 414 of FIG. 4) and the encrypted information from the controller, and generate an authentication code (e.g., the authentication tag 424 of FIG. 4) and decrypted information (e.g., the PT 425 of FIG. 4) using a cryptographic algorithm based on the authentication information, the encrypted information, and a cryptographic key shared between the controller and the semiconductor device (e.g., the K 421 of FIG. 4). In some examples, the cryptographic algorithm includes an Advanced Encryption Standard (AES) algorithm, e.g., AES-GCM or AES-CCM.

In some embodiments, the encrypted information includes information of at least one other option code associated with the authentication information, and the authentication code is generated at least partially based on the at least one other option code in the encrypted information. For example, the option code can include linked message codes in the MAC, a serial number (SN) in the MAC, or a first four bytes of ExtraZone in the MAC.

In some embodiments, the authentication information includes an input authentication code, and the logic circuitry is configured to: compare the generated authentication code with the input authentication code and determine whether an authentication of the controller fails based on a result of the comparing, e.g., as illustrated in FIG. 4 or 6. In some embodiments, the logic circuitry is configured to: in response to determining that the generated authentication code fails to match the input authentication code, determine that the authentication fails and generate an error message; and in response to determining that the generated authentication code matches the input authentication code, determine that the authentication succeeds and proceed to execute the secure write operation on the decrypted information.

In some embodiments, the logic circuitry is configured to: in response to determining that the generated authentication code matches the input authentication code, decode the option code for executing the secure write operation. For example, the logic circuitry can decode the option code based on a predetermined table associating different option codes with different write operations, e.g., as illustrated in FIG. 5.

In some embodiments, the logic circuitry is configured to: in response to determining that the option code specifies writing the data to the first address and the second address, determine whether the first address and the second address in a same memory subarray of the memory array, and execute the secure write operation based on a result of the determining whether the first address and the second address in the same memory subarray, e.g., as illustrated in FIG. 6.

In some embodiments, the decrypted information includes a write command, together with the data to be written, the multiple addresses, and the option code, e.g., as illustrated in FIG. 5. The logic circuitry is configured to decode the write command in response to determining that the generated authentication code matches the input authentication code. The logic circuitry can be configured to decode the write command based on a predetermined protocol between the controller and the semiconductor device. Each of the first and second addresses can represent a starting address for writing the data, and the decrypted information can include length information of the data to write, e.g., a number of bytes to write.

In some embodiments, the logic circuitry is configured to receive a packet command (e.g., AAD 412 of FIG. 4), together with the authentication information, and the encrypted information from the controller. The logic circuitry is configured to generate the authentication code and the decrypted information at least partially based on the packet command.

In some embodiments, the logic circuitry is configured to: determine whether an error occurs during executing the secure write operation (e.g., step 620 of FIG. 6). In response to determining that an error occurs, the semiconductor device generates an error message (e.g., step 610 of FIG. 6). In response to determining that no error is made, the semiconductor device generates a completion message indicating a completion of the secure write operation.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A semiconductor device comprising:
    a memory array; and
    logic circuitry coupled to the memory array and configured to execute a secure write operation in the memory array in response to receiving encrypted information and authentication information from a controller coupled to the semiconductor device,
    wherein the encrypted information comprises at least one of information of data to be written, an option code, or multiple addresses in the memory array, the option code specifying an operation type of writing the data to at least one of the multiple addresses in the memory array during the secure write operation, the multiple addresses in the memory array comprising a first address as a designated address for storing the data and a second address as a backup address for backing up the data, and wherein the memory array comprises multiple memory subarrays, and the first address and the second address are in a same memory subarray or in two different memory subarrays, and
    wherein the secure write operation comprises authentication and data writing, and wherein the logic circuitry is configured to perform a single authentication operation for writing the data to the first address and the second address in the secure write operation based on the encryption information, the authentication information, and a cryptographic key shared between the controller and the semiconductor device.

2. The semiconductor device of claim 1, wherein the secure write operation comprises a programming operation, and
    wherein the option code specifies one of
        programming the data onto the first address, or
        programming the data onto both the first address and the second address.

3. The semiconductor device of claim 1, wherein the secure write operation comprises an erasing operation, and
    wherein the option code specifies one of
        erasing a specific number of bits of the data from the first address, or
        erasing a specific number of bits of the data from both the first address and the second address.

4. The semiconductor device of claim 1,
    wherein the logic circuitry is configured to:
        in response to determining that the first address and the second address are in the same memory subarray, write the data sequentially to the first address and the second address, and
        in response to determining that the first address and the second address are in the two different memory subarrays, write the data concurrently or sequentially to both of the first address and the second address in the two different memory subarrays.

5. The semiconductor device of claim 1, wherein the logic circuitry is configured to:
    generate an authentication code and decrypted information using a cryptographic algorithm based on the authentication information, the encrypted information, and the cryptographic key shared between the controller and the semiconductor device.

6. The semiconductor device of claim 5, wherein the cryptographic algorithm comprises an Advanced Encryption Standard (AES) algorithm.

7. The semiconductor device of claim 5, wherein the encrypted information comprises information of at least one other option code associated with the authentication information, and
    wherein the authentication code is generated at least partially based on the at least one other option code in the encrypted information.

8. The semiconductor device of claim 5, wherein the authentication information comprises an input authentication code, and
    wherein the logic circuitry is configured to:
        compare the generated authentication code with the input authentication code; and
        determine whether an authentication of the controller fails based on a result of the comparing.

9. The semiconductor device of claim 8, wherein the logic circuitry is configured to:
    in response to determining that the generated authentication code fails to match the input authentication code, determine that the authentication fails and generate an error message; and
    in response to determining that the generated authentication code matches the input authentication code, determine that the authentication succeeds and proceed to execute the secure write operation on the decrypted information.

10. The semiconductor device of claim 9, wherein the logic circuitry is configured to:
    in response to determining that the generated authentication code matches the input authentication code, decode the option code for executing the secure write operation.

11. The semiconductor device of claim 10, wherein the logic circuitry is configured to:
    in response to determining that the option code specifies writing the data to the first address and the second address among the multiple addresses, determine whether the first address and the second address in a same memory subarray of the memory array, and execute the secure write operation based on a result of the determining whether the first address and the second address in the same memory subarray.

12. The semiconductor device of claim 9, wherein the decrypted information comprises a write command, together with the data to be written, the multiple addresses, and the option code, and wherein the logic circuitry is configured to decode the write command in response to determining that the generated authentication code matches the input authentication code.

13. The semiconductor device of claim 5, wherein the logic circuitry is configured to receive a packet command, together with the authentication information, and the encrypted information from the controller, and wherein the logic circuitry is configured to generate the authentication code and the decrypted information at least partially based on the packet command.

14. The semiconductor device of claim 1, wherein the logic circuitry is configured to:

determine whether an error occurs during executing the secure write operation, in response to determining that an error occurs, generate an error message, and in response to determining that no error is made, generate a completion message indicating a completion of the secure write operation.

15. A system, comprising:

a semiconductor device comprising a memory array and logic circuitry coupled to the memory array; and a controller coupled to the semiconductor device and configured to:

generate encrypt information comprising at least one of information of data to be written, an option code, or multiple addresses in the memory array, the option code specifying an operation type of writing the data to at least one of the multiple addresses in the memory array, the multiple addresses in the memory array comprising a first address as a designated address for storing the data and a second address as a backup address for backing up the data, and wherein the memory array comprises multiple memory subarrays, and the first address and the second address are in a same memory subarray or in two different memory subarrays, generate, using a cryptographic algorithm, the encrypted information and authentication information based on a cryptographic key shared between the semiconductor device and the controller, the option code, the multiple addresses, and the data to be written, and transmit the encrypted information and the authentication information to the semiconductor device, and wherein the logic circuitry is configured to execute a secure write operation in the memory array in response to receiving the encrypted information from the controller, wherein the secure write operation comprises authentication and data writing, and wherein the logic circuitry is configured to perform a single authentication operation for writing the data to the first address and the second address in the secure write operation based on the encryption information, the authentication information, and the cryptographic key.

16. The system of claim 15, wherein the logic circuitry is configured to:

receive the authentication information and the encrypted information from the controller, and generate an authentication code and decrypted information using the cryptographic algorithm based on the authentication information, the encrypted information, and the cryptographic key.

17. The system of claim 16, wherein the logic circuitry is configured to:

compare the generated authentication code with an input authentication code in the authentication information, in response to determining that the generated authentication code fails to match the input authentication code, generate an error message, in response to determining that the generated authentication code matches the input authentication code, decode the option code for executing the secure write operation, in response to determining that the option code specifies writing the data to the first address and the second address among the multiple addresses, determine whether the first address and the second address in a same memory subarray of the memory array, in response to determining that the first address and the second address are in the same memory subarray, write the data sequentially to the first address and the second address, and in response to determining that the first address and the second address are in the two different memory subarrays, write the data concurrently to both of the first address and the second address in the two different memory subarrays.

18. A method of managing secure operations in a semiconductor device, the method comprising:

receiving encrypted information and authentication information from a controller coupled to the semiconductor device, the encrypted information comprising at least one of information of data to be written, an option code, or multiple addresses in a memory array of the semiconductor device, the multiple addresses in the memory array comprising a first address as a designated address for storing the data and a second address as a backup address for backing up the data, and wherein the memory array comprises multiple memory subarrays, and the first address and the second address are in a same memory subarray or in two different memory subarrays; and in response to receiving the encrypted information, executing a secure write operation in the memory array according to the option code, the option code specifying an operation type of writing the data to at least one of the multiple addresses in the memory array, wherein the secure write operation comprises authentication and data writing, and wherein executing the secure write operation in the memory array comprises:

performing a single authentication operation for writing the data to the first address and the second address in the secure write operation based on the encryption information, the authentication information, and a cryptographic key shared between the controller and the semiconductor device.

19. The method of claim 18, further comprising:

receiving authentication information together with the encrypted information from the controller, generating an authentication code and decrypted information using a cryptographic algorithm based on the authentication information, the encrypted information, and a cryptographic key shared between the semiconductor device and the controller, and in response to determining that the generated authentication code matches an input authentication code in the authentication information, decoding the option code for executing the secure write operation.

* * * * *